United States Patent [19]

Mukai et al.

[11] Patent Number: 4,794,416
[45] Date of Patent: Dec. 27, 1988

[54] FOCUS DETECTION APPARATUS

[75] Inventors: Hiromu Mukai, Kawachinagano; Tokuji Ishida, Daito; Hisashi Tokumaru, Osaka, all of Japan

[73] Assignee: Minolta Camera Kabushiki Kaisha, Osaka, Japan

[21] Appl. No.: 896,391

[22] Filed: Aug. 13, 1986

[30] Foreign Application Priority Data

Aug. 14, 1985 [JP] Japan ............................ 60-179839
Sep. 27, 1985 [JP] Japan ............................ 60-215688

[51] Int. Cl.⁴ .............................................. G03B 3/00
[52] U.S. Cl. ..................................... 354/402; 354/406
[58] Field of Search ............ 354/402, 406, 408, 227.1; 250/201 PF, 204

[56] References Cited

U.S. PATENT DOCUMENTS 4,322,616  3/1982  Fukuhara et al. ................... 354/402
4,370,551  1/1983  Fukuhara et al. ............... 250/204 X
4,526,458  7/1985  Kawamura et al. ................ 354/406

FOREIGN PATENT DOCUMENTS 130725    7/1981  Japan .
60-32013  6/1985  Japan .

*Primary Examiner*—L. T. Hix
*Assistant Examiner*—Brian W. Brown
*Attorney, Agent, or Firm*—Price, Gess & Ubell

[57] ABSTRACT

A focus detection apparatus for a camera comprising: a condensor lens being arranged close to or behind a predetermined focal plane of an objective lens of the camera. A pair of image separation members for separating the image of an object formed on the predetermined focal plane by use of light having been passed through the objective lens into two images which are arranged behind the condensor lens symmetrically with respect to the optical axis of the objective lens, wherein the correlation between the two images formed separately is measured in order to detect the focus condition of the objective lens. The image separating means including a mask for projecting the exit pupil of image separation member within an exit pupil of a cata-dioptric lens system as the objective lens.

7 Claims, 4 Drawing Sheets

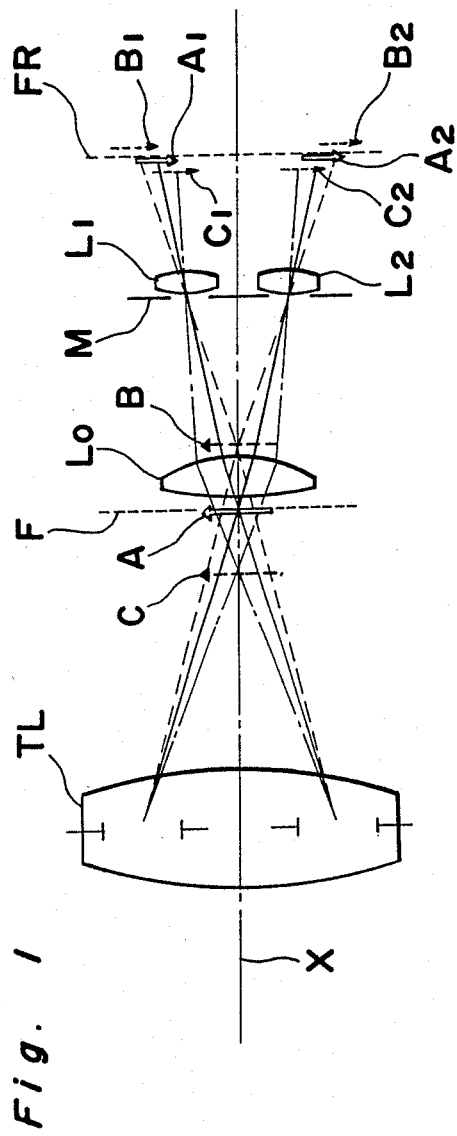
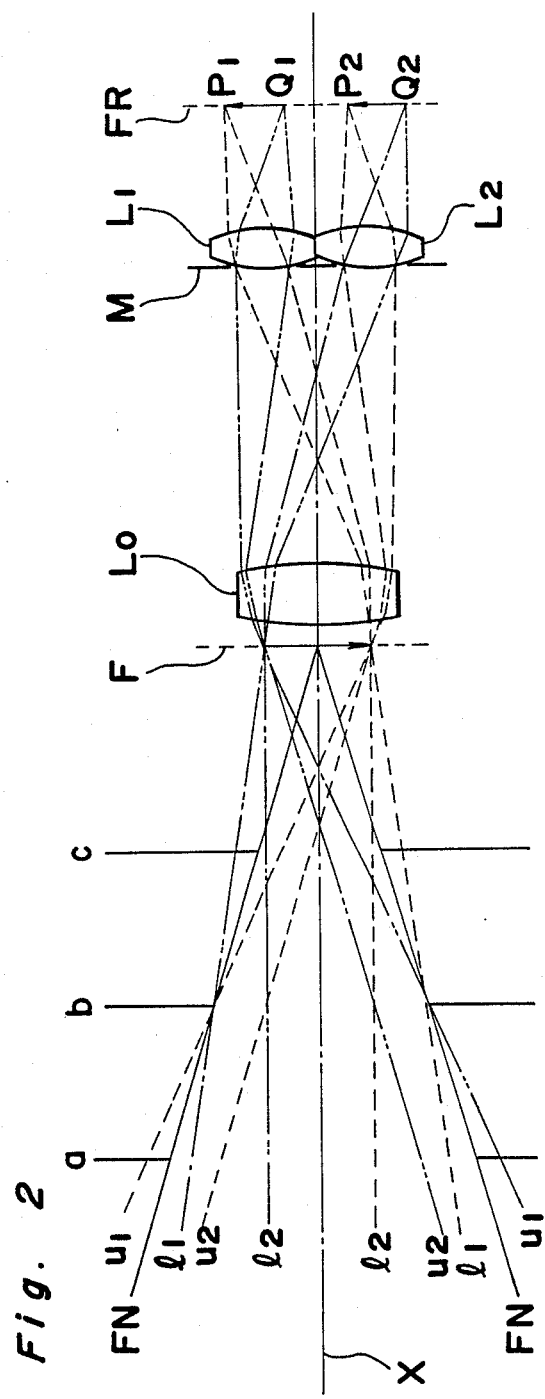
Fig. 1
Fig. 2

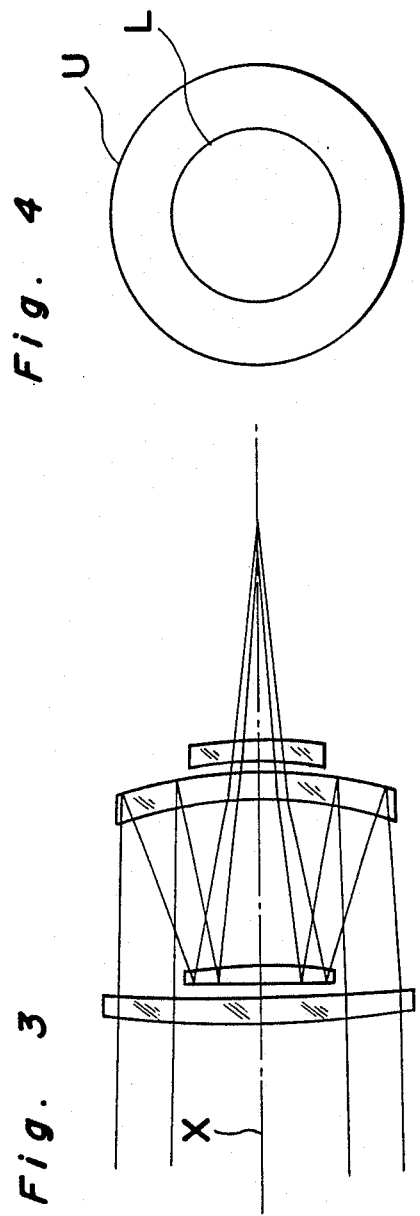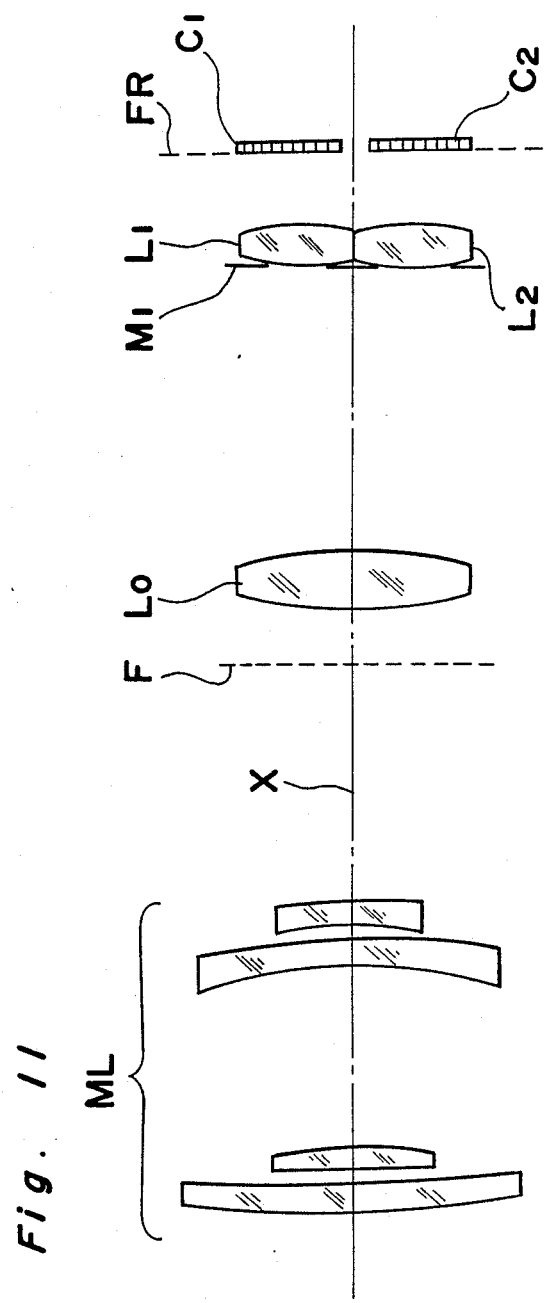

FOCUS DETECTION APPARATUS

BACKGROUND OF THE INVENTION

1. Field of the Invention

The present invention relates to a focus detection apparatus which receives the light transmitted through an objective lens and detects the focus condition of the objective lens.

2. Description of the Prior Art

Various types of focus detection apparatus have been known for automatic focusing. FIG. 1 shows a type of a basic optical system of a focus detection apparatus which is related to the present invention, wherein an imageseparating optical system is used. A condenser lens $L_0$ is set close to or behind a predeterminded focal plane F of an objective lens TL, and a pair of image-re-forming lenses $L_1$ and $L_2$ are set behind the condenser lens $L_0$ symmetrically with respect to the optical axis X of the objective lens TL, with their optical axes parallel to the optic axis X. A light-limiting mask (stop) M is set before the image-re-forming lenses $L_1$, $L_2$.

In the optical system, the focus condition of the objective lens TL can be detected by comparing two images formed on a predetermined focal plane FR of the image-re-forming lenses $L_0$, $L_1$, as will be explained below. If the objective lens TL is brought into an in-focus condition for an object, an image A of the object is formed on the predetermined focal plane F, and a first image $A_1$ and a second image $A_2$ of the image A are formed by the image-re-forming lenses $L_1$ and $L_2$, respectively, on the predetermined focal plane FR. On the other hand, if the objective lens TL is in a rear-focus condition, an image B of the object is formed behind the image A, and a first image $B_1$ and second image $B_2$ of the image B are formed by the image-re-forming lenses $L_1$ and $L_2$ at a position farther than that of each of the first image $A_1$ and the second image $A_2$ in a direction perpendicular to the optical axis, respectively. On the contrary, if the objective lens TL is in a front-focus condition, an image C of the object is formed before the image A, and first and second images $C_1$ and $C_2$ of the image C are formed by the image-re-forming lenses $L_1$ and $L_2$ at a nearer position to the optic axis X, respectively. If a pair of photoelectric converters (not shown) are arranged on the image-re-forming plane FR, the positions of the first and the second images formed by the image-re-forming lenses $L_1$ and $L_2$ can be detected so that it can be decided whether the image of an object is in focus or out of focus.

FIG. 2 shows a relation between the pupil of the objective lens and the exit pupil of the optical system. The condenser lens $L_0$ operates for projecting the images of the pupils of the image-re-forming lenses $L_1$, $L_2$ toward the objective lens side, and the light-limiting mask M which has two apertures for separation is arranged before the image-re-forming lenses $L_1$, $L_2$, and the image of the mask M is projected on a position b in the front side of the condenser lens $L_0$.

A cone defined by lines FN indicates a width of light bundle for obtaining an identical brightness on the plane F. However, if the exit pupil of the objective lens TL is set behind the position b, for example at a position c, a beam along a line $l_1$ does not reach to the plane F, and the brightness at end portions $Q_2$ and $P_1$ of images on the plane FR are decreased while the F-number is kept constant. On the contrary, if the exit pupil of the objective lens TL is set before the position b, for example at a position a, a beam along a line $u_1$ does not reach to the plane F, and the brightness at end portions $Q_1$ and $P_2$ of the images on the plane FR are decreased. If the pupils of the image-re-forming lenses $L_1$, $L_2$ are shaded as mentioned above, errors might be caused upon detecting the focus conditions. Therefore, the light bundle transmitted through the objective lens can be used most efficiently for the focus detection in the case that the position of the exit pupil of the objective lens TL coincides with the position b of the projected image-forming lenses $L_1$ and $L_2$.

A conventional forcus detection apparatus as explained above has been used mainly for an objective lens system of dioptric type. However, it is impossible to use the focus detection apparatus of this type for a catadioptric lens system such as shown by way of an example in FIG. 3. It is desirable that an automatic focus detection apparatus can be used also for a cata-dioptric lens system because it has following advantages:

(a) A cata-dioptric lens system consists of a fewer number of simple lenses, and it is cheaper than a lens of refraction type.

(b) Its total length can be shortened by making use of reflection and its weight can be lessened.

(c) The influence of color dispersion of glass is small owing to reflection, and the chromatic aberration is much smaller than that of a lens system of refraction type.

As for a cata-dioptric lens system, the light does not enter through the central portion of the exit pupil thereof. As shown in FIG. 4, since the light close to an optic axis X of the cata-dioptric lens system is shaded, the configuration of the pupil thereof becomes an annular area defined between an outer circle U and an inner circle L. Thus, the bad effect due to shading on focus detection increases. Therefore, it becomes much more desirable to coincide the projected positions of image-re-forming lenses with the position of the exit pupil of the lens system.

Further a concave lens is used as a rearmost lens element in order to shorten the total length of the cata-dioptric lens system so that the exit pupil thereof locates at a somewhat farther position than that of a lens of refraction type of the same focal length, and the F-number thereof becomes relatively large. From this point of view the coincidence of the projected positions of image-reforming lenses with that of the exit pupil also becomes more desirable.

FIGS. 5–7 show examples of shapes of pupils E' of prior art image-re-forming lenses projected on the exit pupil of objective lens. A pupil E' exists inside the out line U' of the exit pupil of objective lens. Prior art pupils E' shown in FIG. 5 (see Japanese Patent Laid Open Publication No. 32013/1985) are substantially oval; an outer side of the pupil E' has a curvature similar to the outline U' while the other (inner side) has a curvature substantially symmetrical to said outer side curvature. A prior art pupil E' shown in FIG. 6 (see Japanese Patent Laid Open Publication No. 130725/1981) has an outer side of a straight line and an inner side of a straight line, both being parallel to each other; it also has an upper and a lower side each being an arc; the length of the pupil in the longitudinal direction thereof is made longer than the width in the transversal direction. A prior art pupil E' shown in FIG. 7 (see U.S. Pat. No. 4,370,551) has an outer side periphery which extends parallel to the outline U' of the pupil of the objective lens, while it has an inner side periphery being a straight line. These pupils E' as shown in FIGS. 5–7 are not proper to a cata-dioptric lens system since nothing is considered with respect to a possible interference between the inner periphery L of the pupil of the cata-dioptric lens system (see FIG. 4) and the inner side portion of each pupil E' of the image-re-forming lenses.

SUMMARY OF THE INVENTION

An object of the present invention is to provide a focus detection apparatus which can be used for a cata-dioptric lens system.

Another object of the present invention is to provide a focus detection apparatus which can be adapted to a variety of objective lenses each having an individual position of the exit pupil different from each other.

A focus detection apparatus for a camera according to the present invention comprises a condenser lens means being arranged close to or behind a predetermined focal plane of an objective lens of the camera; and a pair of image separation means for separating the image of an object having been passed through said objective lens into two images which are arranged behind said condensor lens means symmetrically with respect to the optical axis of said objective lens, wherein the correlation between said two images formed separately is measured in order to detect the focus condition of said objective lens; said image separating means including a mask means for projecting the exit pupil of said image separation means within an exit pupil of a cata-dioptric lens system as the objective lens.

Another focus detection apparatus according to the present invention comprises the type in which a condenser lens means is arranged close to or behind a predetermined focal plane of an objective lens of the camera; and a pair of image separation means for separating the image of an object having been passed through said objective lens into two images which are arranged behind said condensor lens means symmetrically with respect to the optical axis of said objective lens, and the correlation between said two images formed separately is measured in order to detect the focus condition of said objective lens; said image separating means including a mask means for projecting the exit pupil of said image separation means within an exit pupil of a catadioptric lens as the objective lens, the improvement comprises the mask means which can be selected from a plurality of mask patterns for switching a position of the mask pattern projected onto the objective lens.

An advantage of the present invention is that it provides a focus detection apparatus which can be used for a cata-dioptric lens system.

Another advantage of the present invention is that it provides a focus detection apparatus which can be used for both a cata-dioptric lens system and a lens system of dioptric type.

A further advantage of the present invention is that because the shape of the pupil of the separation optical system in the automatic focus detection optical system can be coincided with that of a the exit pupil of catadioptric lens system, the focus can be detected correctly for a cata-dioptric lens system, and that focus detection becomes correct for a lens system of a small F-number.

A still further advantage of the present invention is that focus detection becomes correct for a lens of a small F-number by changing the position of a the pupil of automatic focus detection optical system or by adopting an effective shape of mask.

BRIEF DESCRIPTION OF THE DRAWINGS

Further objects and advantages of the present invention will be apparent from the following description, reference being had to the accompanying drawing.

In the drawings:

FIG. 1 is a diagram which displays an optical system of a focus detection apparatus with a separation optical system;

FIG. 2 is a diagram which shows a relation between a pupil of an automatic focus detection system and a pupil of an objective lens;

FIG. 3 is a sectional view of a cata-dioptric lens system;

FIG. 4 is a view of an exit pupil of a catadioptric lens;

FIGS. 11 and 12 are diagrams of optical systems for the embodiments, respectively.

DETAILED DESCRIPTION OF THE EMBODIMENTS

As for the focus detection system for a catadioptric lens system ML, it is desirable that the exit pupil of the automatic focus detection optical system has a shape similar to that of an exit pupil of a cata-dioptric lens such as shown in FIG. 3.

Figure 8:
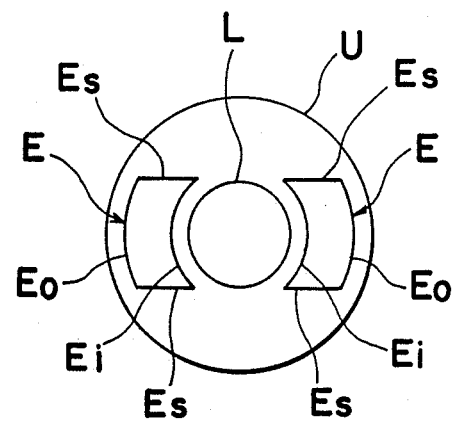
FIG. 8 is a view of pupils of image-re-forming lenses projected on an exit pupil of a cata-dioptric lens system according to another embodiment of the present invention.

FIG. 8 shows shapes of a pair of pupils E according to a preferred embodiment of the present invention, projected on an exit pupil of a cata-dioptric lens system, which is defined by an outer circle U and an inner circle L being coaxial with each other. Projected pupils E should be located between the outer circle U and the inner circle L. An outer side line $E_o$ and an inner side line $E_i$ of the pupil E are coaxial arcs with respect to the center (that is, optic axis), while upper and lower side lines $E_s$ of the projected pupil E are straight lines symmetrical with respect to a center line which passes the center of the exit pupil. Thus, the projected pupil E is defined by four lines $E_o$, $E_s$, $E_i$, $E_s$. The length of the projected pupil E in the longitudinal (vertical) direction is made roughly equal to the diameter of the inner circle L of the exit pupil.

Figure 9:
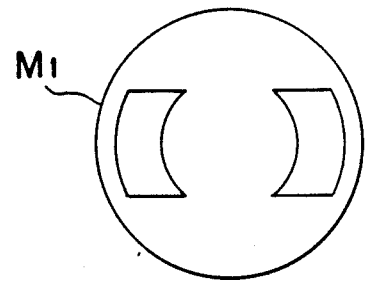
FIG. 9 is a view of a mask for a cata-dioptric lens.

The shape of an a pupil of image-re-forming lens is determined actually by a mask means arranged in front of said lens which defines a pair of apertures for passing light therethrough. Therefore, if the mask means M1 has such a pair of apertures that pupils E due to said pair of apertures may be projected on and within the annular exit pupil as shown in FIG. 9, it can be applied to a catadioptric lens system without accompanying any shading of images. If such a mask M1 suitable for a cata-dioptric lens system is adopted, a focus detection apparatus can detect the focus condition accurately for a cata-dioptric lens system.

Further, if the shape of apertures of a mask can be changed, focus detection apparatus can be adapted to various types of objective lenses, that is, it can be used more generally.

Figure 10:
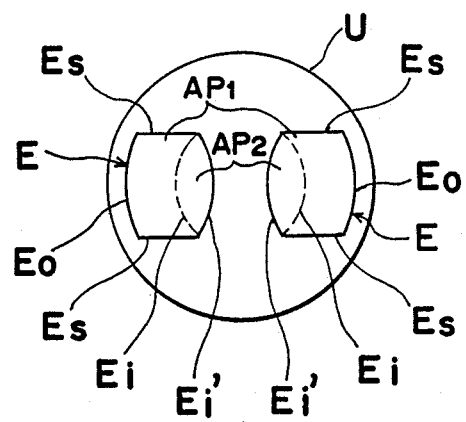
FIG. 10 is a view of a mask made for electroptic device according to an embodiment of the invention.

FIG. 10 shows a mask $M_2$, made for an electroptic device which can change the shape of pupil E electrically according if the objective lens system is of a cata-dioptric type or of a dioptric type. For example, the mask comprises an electric shutter made of a liquid crystal device or an electrochromic device. The aperture for separation consists of two parts AP1 and AP2 so as to change according to whether the objective lens is a lens of a dioptric type or of a catadioptric type. The portion AP1 corresponds to a pupil E for a cata-dioptric lens system shown in FIG. 8, that is, the part AP1 is defined by an outer side line $E_o$, an inner side line $E_i$ (dashed line), an upper side line $E_s$ and a lower side line $E_s$; the sides $E_o$ and $E_i$ are coaxial arcs with respect to the center (optic axis), while two sides $E_s$ are straight lines symmetrical with respect to a center line which passes the center of the exit pupil. The AP2 is defined by the side line $E_i$ and $E_i'$, wherein the side $E_i'$ is made symmetric with respect to the outer side $E_o$. Only the portion AP1 is opened electrically for a cata-dioptric lens system, while both portions AP1 and AP2 are opened electrically for a lens of a dioptric type.

An outer shape $E_o$ and an inner shape $E_i$ may be precise coaxial arcs. They may consist of a plurality of linear lines which approximate the abovementioned arc in order to improve the workability (refer Japanese Patent Laid Open Publication No. 32,013/1985).

Figure 12:
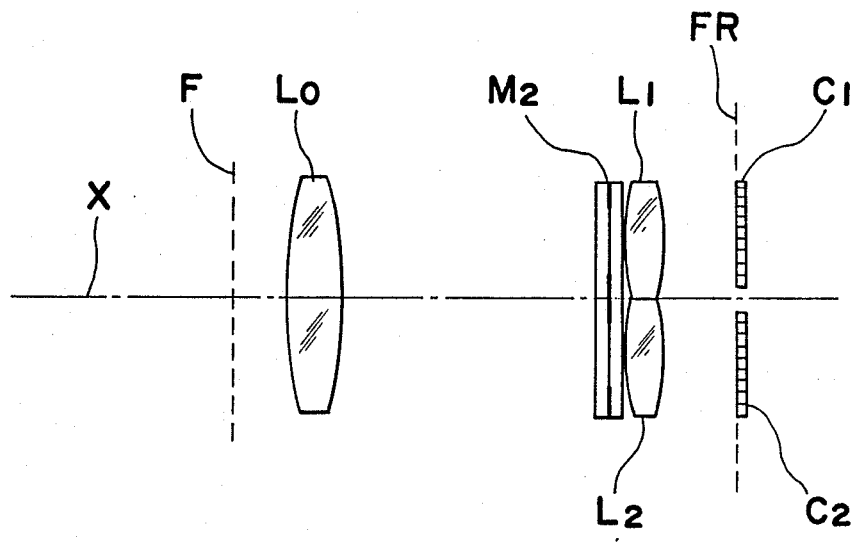

FIGS. 11 and 12 show optical systems of a focus detection apparatus for a cata-dioptric lens system ML wherein a mask $M_1$ and a mask $M_2$ shown in FIG. 9 and in FIG. 10 are installed, respectively. In both optical systems, a condenser lens $L_0$ is put close or behind a predetermined focal plane F of a cata-dioptric lens system ML, and a pair of image-re-forming lenses $L_1$ and $L_2$ are set behind the condenser lens $L_0$ symmetrically with respect to the optic axis X of the objective lens, with their optic axes set parallel to the optic axis X. The mask $M_1$ or $M_2$ is set in front of the image-re-forming lenses $L_1$, $L_2$, preferably at a position where the exit pupil of the cata-dioptric lens ML coincides with the extrance pupil of the automatic focus detection system. Electroptical sensors $C_1$ and $C_2$ are set at image-forming planes FR of the image-re-forming lenses $L_1$, $L_2$, respectively.

As for the optical system shown in FIG. 12, either the inside $E_1$ or $E_1'$ can be selected electrically according to whether the objective lens (not shown) is a cata-dioptric lens system ML or a lens system of dioptric type. In other words, the focus detection apparatus can be applied for both types of objective lenses.

As explained above, the inside of a light bundle is liable to be shaded in an optical system for a catadioptric lens system ML. Therefore, the position of the exit pupil of the cata-dioptric lens system ML is desirably located so as to coincide with that of the pupil projected by the image-re-forming lens as precisely as possible in order to make use of a beam effectively.

If the position of the pupil projected by the image-re-forming lens can be changed, the same focus detection apparatus can be used for many objective lenses. The change can also be useful for a lens system of dioptric type.

The position of the exit pupil of the image-reforming lens can be changed by using the following methods:

(a) changing the position of the condenser lens;
(b) changing the focal length of the condenser lens;
(c) changing of the position of the pupil of image-reforming lenses; and
(d) installation of a plurality of automatic focus detection optical systems each with a position of the exit pupil different from each other.

Figure 5:
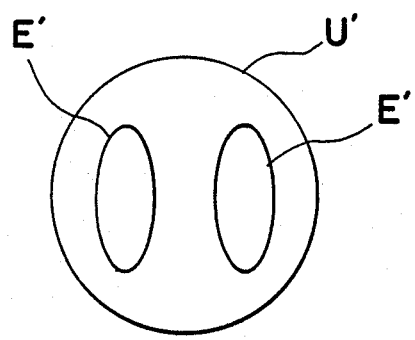
FIGS. 5–7 are views of prior art pupils E' of image-re-forming lenses projected on an exit pupil of an objective lens.
Figure 6:
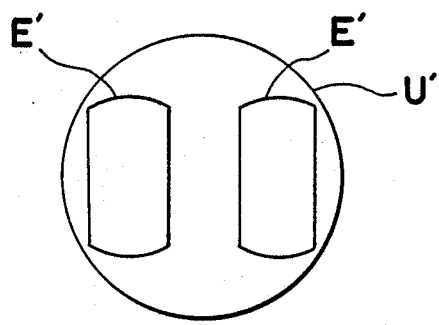
Figure 7:
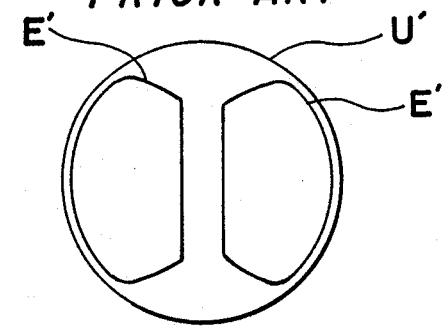
Figure 13:
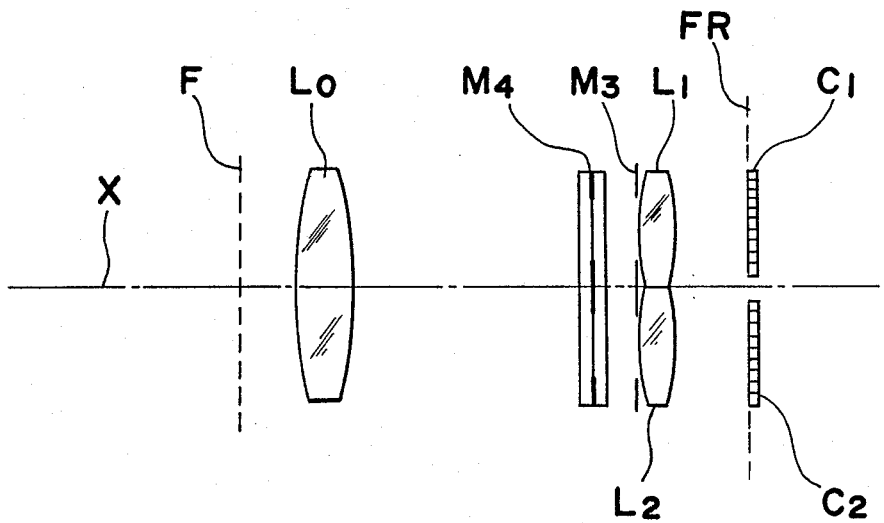
FIG. 13 is a diagram of an optical system which has two beam-limiting masks.

In this embodiment, we adopt the method (c). FIG. 13 shows an optical system of a focus detection apparatus which is the same as those shown in FIGS. 10 and 11 except that two masks $M_3$ and $M_4$ are arranged. A mask $M_3$ of an ordinary type of an objective lens as shown in FIGS. 5-7 is fixed in front of the image-re-forming lenses $L_1$, $L_2$, while another mask $M_4$ of an electroptic device which makes use of a liquid crystal device or an electrochromic device is set in front of the image-re-forming lenses $L_1$, $L_2$ distant a little from the mask $M_3$. The mask $M_4$ has a shape shown in FIG. 9 for a cata-dioptric lens system, and the position of the mask $M_4$ is determined so that the position of the exit pupil of a cata-dioptric lens system ML coincides with that of the entrance pupil of the automatic focus detection system. If necessary, the mask $M_4$ can be generated by applying an electric voltage to the electrical shutter of the mask $M_4$ or not according to the type of the shutter.

Usually, an objective lens of refraction type is used for taking a photograph. In such cases, the mask $M_3$ is adopted. On the other hand, when an objective lens such as a cata-dioptric lens system which has a distant exit pupil is used, the mask $M_4$ is generated, and the image of the mask $M_4$ is projected farther than that of the other $M_3$. The mask $M_3$ can be made of an electroptic device if the mask $M_4$ is of an ordinary type. Further, both masks $M_3$, $M_4$ can be made of electroptic devices. It is also possible that a mask $M_3$ or $M_4$ is made of an electroptic device of a type shown in FIG. 10 which can generate two types of pupils.

While the embodiments of the present invention, as herein disclosed, constitute preferred forms, it is to be understood that other forms which come within the meaning of the claims might be adopted.

What is claimed is:

1. A focus detection apparatus for a camera comprising:
   a condensor lens means being arranged close to or behind a predetermined focal plane of an objective lens of the camera; and
   an image separation means for separating an image of an object formed on the predetermined focal plane by use of light having been passed through said objective lens into two images, including:
   a pair of separation lenses arranged, behind said condensor lens means, symmetrically with respect to the optical axis of said objective lens; and
   a mask means for projecting exit pupils of said image separation means within a range which covers both of an exit pupil of a cata-dioptric lens system as the objective lens and an exit pupil of a dioptric lens system as the objective lens, having a pair of apertures whose outer shapes are determined in accordance with the shape of the exit pupil of the dioptric lens system and whose inner shapes are determined in accordance with the shape of the exit pupil of the cata-dioptric lens system, wherein the correlation between the two images formed separately is measured in order to detect the focus condition of the objective lens.

2. A focus detection apparatus according to claim 1, wherein the outer and inner shapes of said pair of apertures are coaxial arcs with the optical axis of the objective lens.

3. A focus detection apparatus according to claim 2, wherein said mask means defines a pair of apertures for separation comprising an inner side and an outer side, both sides being coaxial arcs with the optic axis of the objective lens.

4. A focus detection apparatus according to claim 3, wherein said arc of inner shape or outer shape of the apertures of the mask means is approximated by linear lines.

5. A focus detection apparatus according to claim 3, wherein said mask means is an electroptic device which can generate said apertures.

6. A focus detection apparatus according to claim 5, wherein said mask means can generate two types of apertures.

7. A focus detection apparatus according to claim 1, wherein said mask means is put in a position wherein the exit pupil of the cata-dioptric lens system coincides with the entrance pupil of the image separation means.

* * * * *